(12) United States Patent
Fujita et al.

(10) Patent No.: US 7,587,527 B2
(45) Date of Patent: Sep. 8, 2009

(54) MULTIFUNCTIONAL PERIPHERAL INCLUDING A FUNCTION TO SEND IMAGE, VIDEO, VOICE, AND TEXT DATA FROM A SCANNER TO A SPECIFIED DESTINATION

(75) Inventors: Fusayuki Fujita, Yamatokoriyama (JP); Yoshiharu Kurozasa, Ikeda (JP)

(73) Assignee: Sharp Kabushiki Kaisha, Osaka (JP)

( * ) Notice: Subject to any disclaimer, the term of this patent is extended or adjusted under 35 U.S.C. 154(b) by 274 days.

(21) Appl. No.: 11/603,524

(22) Filed: Nov. 21, 2006

(65) Prior Publication Data

US 2007/0168459 A1 Jul. 19, 2007

(30) Foreign Application Priority Data

Nov. 21, 2005 (JP) ............................. 2005-336065

(51) Int. Cl.
*G06F 15/16* (2006.01)
(52) U.S. Cl. ............... 710/33; 710/1; 710/8; 710/9; 710/10; 710/19; 709/217; 709/223
(58) Field of Classification Search .............. 710/1, 710/8–10, 19, 33; 709/217, 223
See application file for complete search history.

(56) References Cited

U.S. PATENT DOCUMENTS

| 6,339,477 | B2 * | 1/2002 | Mori | 358/1.14 |
| 6,895,451 | B2 * | 5/2005 | Kondo | 710/19 |
| 7,038,801 | B2 * | 5/2006 | Kurozasa et al. | 358/1.15 |
| 7,209,246 | B2 * | 4/2007 | Suda et al. | 358/1.14 |

FOREIGN PATENT DOCUMENTS

JP 2004-206302 7/2004

* cited by examiner

*Primary Examiner*—Tammara Peyton
(74) *Attorney, Agent, or Firm*—Edwards Angell Palmer & Dodge LLP; David G. Conlin; David A. Tucker (57) ABSTRACT

An apparatus to output a large variety of input data in a desired form is provided. A file of data to be output is specified from among data accumulated in a hard disk device in a data processing apparatus and an output condition is specified. It is determined whether the data can be output under the specified output condition. If the data can be output, it is output under the output condition. For example, the data is printed as an image. The data is sent to a foreign apparatus directly or sent by attaching it to an e-mail. The data is sent to a foreign storage device. If the data cannot be output, link information to access the data is sent by an e-mail.

15 Claims, 9 Drawing Sheets

DATA INPUT

[FIG. 4]

| | | |
|---|---|---|
| 📄 MINUTES OF MEETING 2005-09-09.doc | [V] | SEND |
| 📄 MINUTES OF MEETING 2005-09-07.doc | [ ] | SELECT DESTINATION |
| 📷 SPECIFICATION REVIWE MEETING 2005-09-07.ppt | [ ] | E-mail |
| 📷 MEETING FOR PRESENTATION & STRATEGY FOR NEW PRODUCT 2005-09-09.ppt | [V] | ☐ SEND BY ATTACHING FILE<br>☐ SEND LINK ONLY |
| 🖼 WHITEBOARD 2005-09-09.jpg | [V] | SELECT DESTINATION TO SAVE |
| 🔊 VOICE 2005-09-09.wav | [V] | 192.168.123.45 |

FIG. 5

ATTACHING TO E-MAIL

To: member @xxx.co.jp
Date: Fri. 9 Sep 2005 15:02:34 JST
Subject: MINUTES OF MEETING ON 10:30 A.M. SEP. 9 2005

**************************
I'm sending the minutes of meeting on 10:30 a.m. Sep. 9 2005

MINUTES OF MEETING          WHITEBOARD              VOICE
2005-09.09.doc              2005-09-09.jpg          2005-09-09.wav

| | | |
|---|---|---|
| 📄 MINUTES OF MEETING 2005-09-09.doc | [V] | SEND |
| 📄 MINUTES OF MEETING 2005-09-07.doc | [ ] | SELECT DESTINATION |
| 🔘 SPECIFICATION REVIWE MEETING 2005-09-07.ppt | [ ] | 192.168.123.45 |
| 🔘 MEETING FOR PRESENTATION & STRATEGY FOR NEW PRODUCT 2005-09-09.ppt | [V] | ☐ SEND FILE ONE BY ONE |
| 🖼 WHITEBOARD 2005-09-09.jpg | [V] | ☐ SEND ALL FILES COMPRESSED |
| 🔊 VOICE 2005-09-09.wav | [V] | |

[FIG. 7]

| | | |
|---|---|---|
| 📄 MINUTES OF MEETING 2005-09-09.doc | [V] | [ SEND ] |
| 📄 MINUTES OF MEETING 2005-09-07.doc | [ ] | [ SELECT DESTINATION ] |
| 📊 SPECIFICATION REVIWE MEETING 2005-09-07.ppt | [ ] | USB port |
| 📊 MEETING FOR PRESENTATION & STRATEGY FOR NEW PRODUCT 2005-09-09.ppt | [V] | [ ] SAVE FILE ONE BY ONE |
| 🖼 WHITEBOARD 2005-09-09.jpg | [V] | [ ] SAVE ALL FILES COMPRESSED |
| 🔊 VOICE 2005-09-09.wav | [V] | |

FIG. 8

ATTACHING LINK TO E-MAIL

```
To: member @xxx.co.jp
Date: Fri. 9 Sep 2005 15:02:34 JST
Subject: MINUTES OF MEETING ON 10:30 A.M. SEP. 9 2005

************************
Minutes of meeting on 10:30 a.m. Sep. 9 2005 are stored
in the following folder:

http://192.168.123.45/meetings/2005-0909/.
```

FIG. 9

PRINT OUT (INDICES)

MINUTES OF MEETING ON 10:30 A.M. SEP. 9 2005

************************

| TIME | CONTENTS | LOCATIONS OF FILES |
|---|---|---|
| 10:30 | PRESENTATION | http://·············· |
| 10:48 | COMMENTS | http://·············· |
| 10:52 | REFERENCE MATERIAL DISTRIBUTION | http://·············· |
| 10:54 | COMMENTS | http://·············· |
| 11:07 | PRESENTATION | http://·············· |

FIG. 10

PRINT OUT (ALL CONTENTS)

---

MINUTES OF MEETING ON 10:30 A.M. SEP. 9 2005

**************************
ATTENDANTS: OO (MANAGER), PP (ASSISTANT MANAGER),
            QQ (SUPERVISOR), RR (SUPERVISOR), AA, BB, CC
AGENDA: 1. SCHEDULE OF RELEASE OF NEW PRODUCT
           RELEASE OF AZ-A100: OCT.25; SUGGESTED RETAIL
           PRICE IS ¥148,000 (TAX INCLUSIVE)
           Prior to the release, press release is held at a hotel
           in Shinjuku ward, Tokyo at 13:00 Oct. 20.
           ATTENDANTS: XO (VICE PRESIDENT), YY (GROUP
           GENERAL MANAGER), OA (SALES DEPARTMENT MANAGER),
           OO (MANAGER)

| REFERRENCE MATERIAL FOR PRESENTATION |

MULTIFUNCTIONAL PERIPHERAL INCLUDING A FUNCTION TO SEND IMAGE, VIDEO, VOICE, AND TEXT DATA FROM A SCANNER TO A SPECIFIED DESTINATION

BACKGROUND OF THE INVENTION

1. Field of the Invention

The present invention relates to a data processing apparatus that can output a large variety of data such as an input image, video or voice.

2. Description of the Related Art

Some data processing apparatuses such as multifunction peripherals (MFP) comprise a function to send image data input from a scanner to a specified destination by attaching the image data to an e-mail. Using this function, to create minutes of meeting, for example, it is possible to read distributed reference material by a scanner to transform it to image data and send it to involved parties along with the created minutes of meeting.

Furthermore, as described in the Japanese Patent Laid-Open No. 7-191690, for example, remarks during a meeting are input from a microphone to an information processing apparatus such as a PC, and minutes of meeting are created by converting the voice into letters in the information processing apparatus. The minutes of meeting are input to a data processing apparatus from the information processing apparatus and printed, i.e. output as an image on a recording material.

The above data processing apparatus can only process image data, but cannot process voice data or video data shot by a camera. For this reason, in the case that a large variety of data need to be processed as in the creation of minutes of meeting, the data processing apparatus is of no use.

Meantime, the data processing apparatus has a function of sending data by an e-mail. However, this function can be used for limited data only, so it is not exactly utilized effectively.

In the light of the above issues, the present invention aims to provide a data processing apparatus that can output a large variety of data having different attributes in a desired form.

BRIEF SUMMARY OF THE INVENTION

The present invention provides a data processing apparatus comprising data inputting means for inputting data and data outputting means for outputting data by a pre-determined processing method, the data processing apparatus further comprises accumulating means for accumulating the input data and processing decision means for deciding a processing method according to attributes of the input data, the data outputting means outputs the accumulated data based on the decided processing method.

The processing decision means selects a processing method suitable to the data from among a plurality of processing methods. At this time, it can select a plurality of processing methods, instead of selecting a single processing method. If the data cannot be output by the single processing method, it can be output by other processing methods. This processing allows treating a large variety of data having different attributes, thereby expanding application of the data processing apparatus.

The processing decision means determines whether the data can be output by the decided processing method, and if the data cannot be output, the accumulating means accumulates the data. If the data can be output, it is output by the decided processing method. The data processing apparatus comprises guide means for presenting a processing method for the accumulated data if the data cannot be output.

The guide means selects another processing method from among the plurality of processing methods. If the data cannot be output by the other processing method, the guide means outputs link information to access the accumulated data. This link information is sent to a specified foreign apparatus.

A foreign apparatus that desires to get data can access the data according to the link information. So, even if the data processing apparatus cannot output the data to the foreign apparatus, the foreign apparatus can access the data directly to download it. The foreign apparatus can be assured of getting the data.

The data processing apparatus comprises data integration means for associating a string of data among a plurality of data in the case that the plurality of data are input; accumulating means for accumulating the plurality of associated data; and processing decision means for deciding a processing method according to attributes of the accumulated data, the data outputting means outputs the plurality of associated data based on the decided processing method. By these means, the plurality of associated data are output collectively.

The processing decision means determines whether a particular processing method can apply to the plurality of associated data and decides to use said particular processing method if the method can apply to the data. By outputting the data by the particular processing method, the associated data can be output at one time, thereby making the data output process easier.

The data outputting means groups the plurality of associated data and then outputs the data. The grouping of the data, for example, groups a plurality of data files into a folder or arranges a common part in names of the data files. By this grouping, a plurality of associated data are output collectively, instead of being output separately. As a result, treatment for the associated data becomes easier and the data becomes more accessible.

The data processing apparatus further comprises data selecting means for selecting desired data from among the plurality of associated data, the data outputting means outputs the selected data. The data outputting means can output necessary data or important data only. Accordingly, even in case of an emergency, the data can be output in a time-saved manner, that is, quickly.

The data includes at least one of image data, video data, voice data and text data, and the data outputting means comprises image outputting means for outputting the data as an image and data sending means for out putting the data directly. The data sending means comprises communication means for sending the data to foreign apparatuses directly; data transfer means for transferring the data to a foreign storage device; and e-mail means for sending the data to the foreign apparatuses by attaching the data to an e-mail.

Further, the above data processing apparatus and foreign apparatuses are connected to one another through a network such that they can communicate with one another, and a data creating apparatus that creates the data outputs the data to the data processing apparatus. The data processing apparatus, the foreign apparatuses and the data creating apparatus constitute a data processing system that outputs a large variety of data in a desired form. The data processing apparatus comprises data integration means for associating a plurality of data and grouping the data when the plurality of data having different attributes are input, and data outputting means for outputting each grouped data to the foreign apparatuses by processing methods for the attributes of each data. In this system, the data processing apparatus functions as a data server, since it can deliver the associated data to a large number of related foreign apparatuses.

In particular, the data outputting means creates an e-mail from the plurality of data in a format that can be output in the foreign apparatuses and sends the e-mail to the foreign apparatuses. A format that can be output includes attachment of the data to an e-mail, description of a particular type of data in a message body of the e-mail, or description of link information in the message body so as to be able to access the data. The foreign apparatuses are in a state that can be checked for contents of the data.

According to the present invention, even if a large variety of data are input, the data can be output in a form depending on attributes of the data. In particular, when a plurality of associated data are input and their respective attributes differ from one another, the associated data can be output collectively, or be output in a form suitable to each data. Accordingly, application of the data processing apparatus expands, for example the apparatus not only has a function of outputting an image, but it functions as a data server, thereby increasing its utility.

Description of Symbols

DETAILED DESCRIPTION OF THE PREFERRED EMBODIMENT(S)

Figure 1:
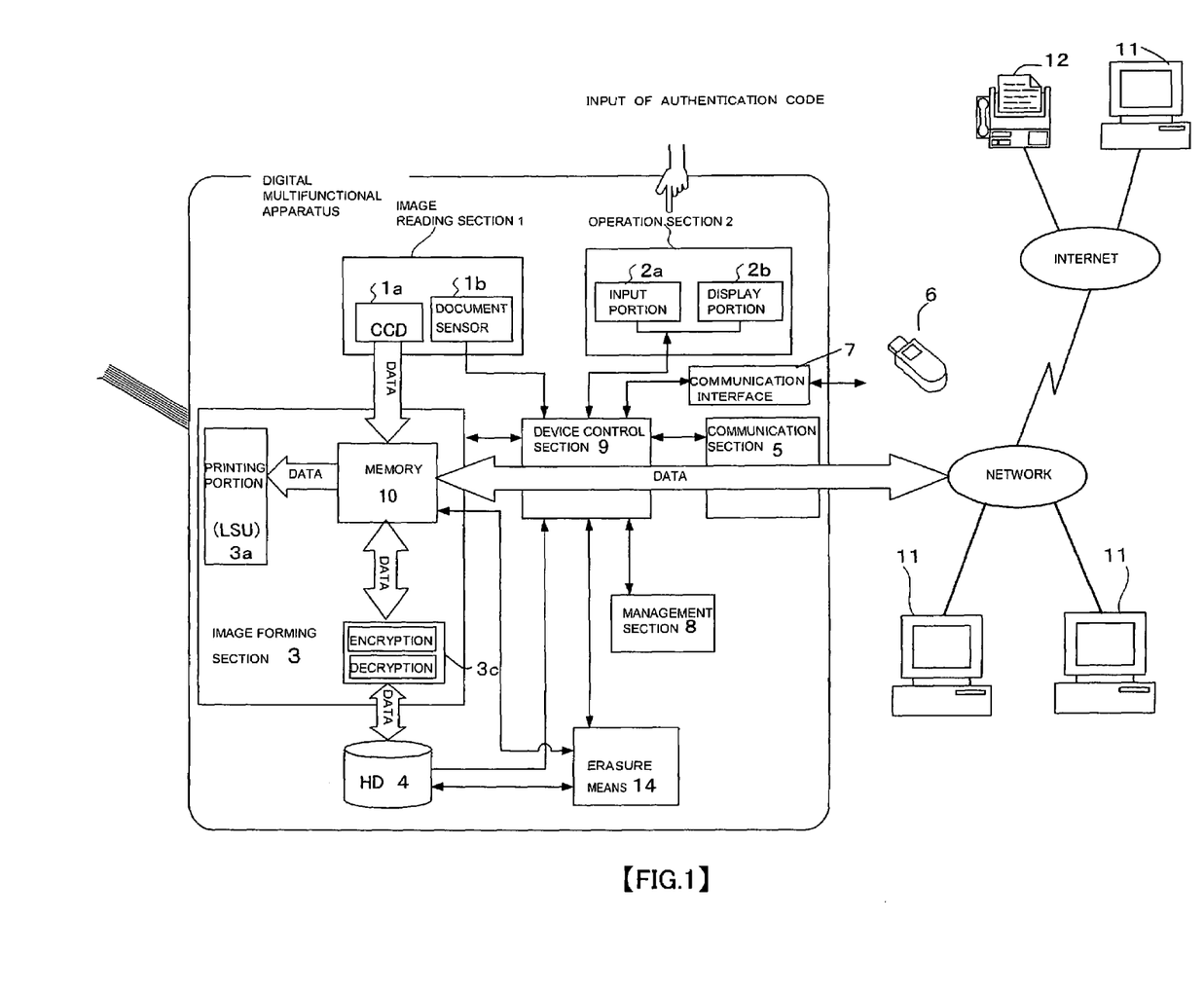
FIG. 1 is a diagram showing a schematic configuration of a data processing apparatus according to the present invention.

FIG. 1 shows a data processing apparatus in an embodiment. The data processing apparatus is a multifunction peripheral as a digital multifunction machine having copy mode, printer mode, scanner mode, and facsimile mode. The data processing apparatus includes: an image reading section 1 that reads a document and inputs image data; an operation section 2 that receives user inputs; an image forming section 3 that prints input image data; a hard disk device 4 that saves image data; a communication section 5 that communicates data with an foreign apparatus through a network; a communication interface 7 that communicates with an foreign storage device 6; a management section 8 that stores information such as control information and setting information about the entire apparatus; and a device control section 9 responsible for controlling the entire apparatus.

The image reading section 1 functions as data inputting means for inputting image data and includes an imaging device such as a CCD 1a, and a document sensor 1b that senses a document placed on a document platform or on an automatic document feeder (ADF). The image data read by the CCD 1a is output to the image forming section 3.

The operation section 2 includes an input unit 2a consisting of various input keys, and a display unit 2b such as a liquid crystal display. The operation section 2 allows operations for the entire apparatus and inputting of various settings, and displays the input content and the operational state of the entire apparatus.

The image forming section 3 has a local memory 10 for storing input image data, and a printing unit 3a implemented as a laser scanning unit. The local memory 10 is implemented using readable/writable semiconductor memory, such as SDRAM or flash memory. The local memory 10 stores image data by overwriting old image data with new image data. The printing unit 3a prints an image on a recording material based on the image data stored in the local memory 10.

In the image forming section 3, input image data is stored in the local memory 10. The image data is subjected to image processing such as compression, decompression, or modification and stored in the local memory 10. The image data subjected to the image processing is output to the printing unit 3a, the hard disk device 4 or the device control section 9. That is, the image forming section 3 functions as data outputting means for outputting data as images.

The local memory 10 is divided into a region for storing input image data and a region for storing image data to be output. Instead of using one local memory 10 divided into two regions, two local memories 10 can be used for input and output, respectively.

The communication section 5 is connected to a router, switching hub or the like via a LAN cable, and further connected to a network such as LAN or WAN formed by information processing apparatuses 11 such as personal computers or servers. The network is connected to the Internet via a telephone network or via a communication line such as a fiber-optic line.

Both the data processing apparatus and the information processing apparatus 11 are equipped with browsers and e-mail software and have their respective IP addresses and e-mail addresses. The communication section 5 sends/receives data and an e-mail to/from the information processing apparatus 11 in the network according to an existing communication protocol such as the TCP/IP protocol, and sends/receives data and an e-mail to/from the foreign information processing apparatus 11 or the facsimile machine 12 through the Internet. Although not shown in the drawing, the data processing apparatus comprises a FAX modem so that it is connected to a telephone line network via a telephone line to communicate with a foreign facsimile machine.

The communication interface 7 is connected to an external storage device using a hard disk, a DVD or the like as storage media or the foreign storage device 6 such as a USB memory, and sends/receives data. The communication interface 7 also sends/receives data to/from a foreign apparatus such as a personal digital assistant or an information processing apparatus by radio communication such as IR, Bluetooth (R) or wireless LAN.

In this manner, the communication section 5, the communication interface 7 and the FAX modem function as data inputting means since image data or other data is input from the foreign apparatus through them. Additionally, the communication section 5, the communication interface 7 and the FAX modem also function as data outputting means since they output data to the foreign apparatus.

The hard disk device 4 is accumulating means for temporarily saving image data. When image data is saved in the hard disk device 4, the image data is encrypted by an encryption/decryption unit 3c. When the image data is read from the hard disk device 4, the image data is decrypted by the encryption/decryption unit 3c.

The data processing apparatus further includes erasure means 14 for erasing image data in the hard disk device 4. The hard disk device 4 has a filing area to accumulate data and a processing area to temporarily store data. The image data to be erased is the data stored in the processing area. The device control section 9 processes and outputs image data, and then controls operation of the erasure means 14. The erasure means 14 makes the stored image data unreadable by overwriting random data or meaningless data or by erasing data to invalidate the original image such that the original image cannot be restored. The erasure means 14 may also invalidate the image data by overwriting old image data to erase it or erasing image data in the local memory 10.

In response to an input from the data inputting means, the device control section 9 controls relevant components based on information stored in the management section 8 and processes input data, according to input by the operation unit 2 or commands by foreign apparatuses. For example, the input image data is processed in either of copymode, printermode, scanner mode, or facsimile mode and is output in a desired form.

Now, operations for image data in each mode will be described. In copy mode, image data of a document that is read by the image reading section 1 is output as a copy from the image forming section 3. Specifically, an image of a document placed at a reading position is read by the CCD 1a. The image data that is output from the CCD 1a is made up into an outputting image in the local memory 10 and sent to the hard disk device 4 to be temporarily saved there. For a plurality of documents, this reading and storage operation is repeated.

Then, based on processing indications provided from the operation section 2, the image data saved in the hard disk device 4 is sequentially read in a timely manner and sent to the local memory 10. Timed to writing operations to the printing unit 3a, the image data is transferred from the local memory 10 to the printing unit 3a, and the image is printed on a recording material.

Similarly, if a plurality of copies of the read image data are printed, the image data is saved on a page basis in the hard disk device 4 as outputting images and sent from the hard disk device 4 to the local memory 10 according to the output mode. Timed to writing operations to the printing unit 3a, the image data in the local memory 10 is repeatedly transferred to the printing unit 3a as many times as the number of copies to be output.

In printer mode, image data that is output from a foreign apparatus is output from an image forming section 3. That is, the image data from the information processing apparatus 11 is received by the communication section 5 through a network. Alternatively, image data from the foreign storage device 6 is input through the communication interface 7. The device control section 9 sends the input image data to the local memory 10, decompresses the image data on a page basis as outputting image data, and temporarily saves the image data in the hard disk device 4. The image data is sent from the hard disk device 4 to the local memory 10, and transferred to the printing unit 3a as in the case of copy mode, and the image is printed.

In scanner mode, image data of a document that is read in the image reading section 1 is communicated to a specified foreign apparatus over the network. That is, the image data that is output from the CCD 1a is made up into an outputting image in the local memory 10 and temporarily saved in the hard disk device 4. The image data is sent from the hard disk device 4 to the local memory 10. The device control section 9 establishes communication with the information processing apparatus 11 specified via the operation section 2 and transmits the image data from the communication section 5 to the information processing apparatus 11. The image data may also be transmitted to the foreign information processing apparatus 11 or the facsimile machine 12 from the communication section 5 over the network and the Internet. If the foreign storage device 6 is specified, the image data is sent to the foreign storage device 6 through the communication interface 7. The data can be merely sent directly in the above manner, but the image data can also be attached to an e-mail to be sent to the specified information processing apparatus 11.

In facsimile mode, the device control section 9 sends image data to a facsimile machine from a FAX modem through a telephone line by similar operations as in printer mode instead of printing it.

In the processing of the image data that has been input from the data inputting means as described above, the image data is temporarily stored in the local memory 10. When the image data is processed and output completely, the erasure means 14 erases the image data from the hard disk device 4.

The data processing apparatus according to the present invention can output data other than image data such as voice data, video data, document data or program data having different attributes. Image data is data that can be printed as an image. Video data is a moving image, while a still image captured from a moving image is an image data. Document data is data created by word processor software or spreadsheet software. If the data processing apparatus is equipped with application software that can treat document data, it can print the document data as an image.

That is, since treatment for respective data differs, data output mode is executed to output by an appropriate processing method depending on the data. To execute this data processing mode, the device control section 9 comprises means for accumulating input data into the hard disk device 4 from a foreign apparatus such as the information processing apparatus 11 or the foreign storage device 6 or the image reading section 1; means for deciding a processing method based on attributes of the input data; means for determining whether the data can be output by the decided processing method; means for outputting the data accumulated in the hard disk device 4 based on the decided processing method; and means for guiding to other processing methods if it is determined that the data cannot be output.

Figure 2:
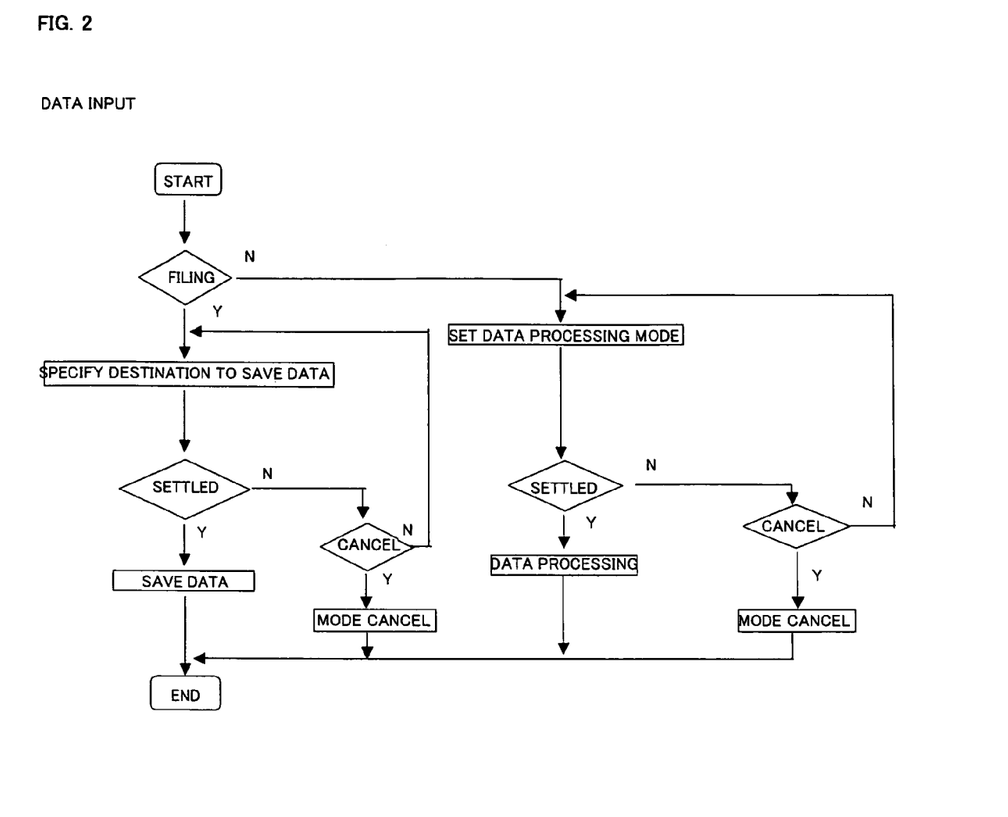
FIG. 2 is a flowchart at data input in data output mode.
Figure 3:
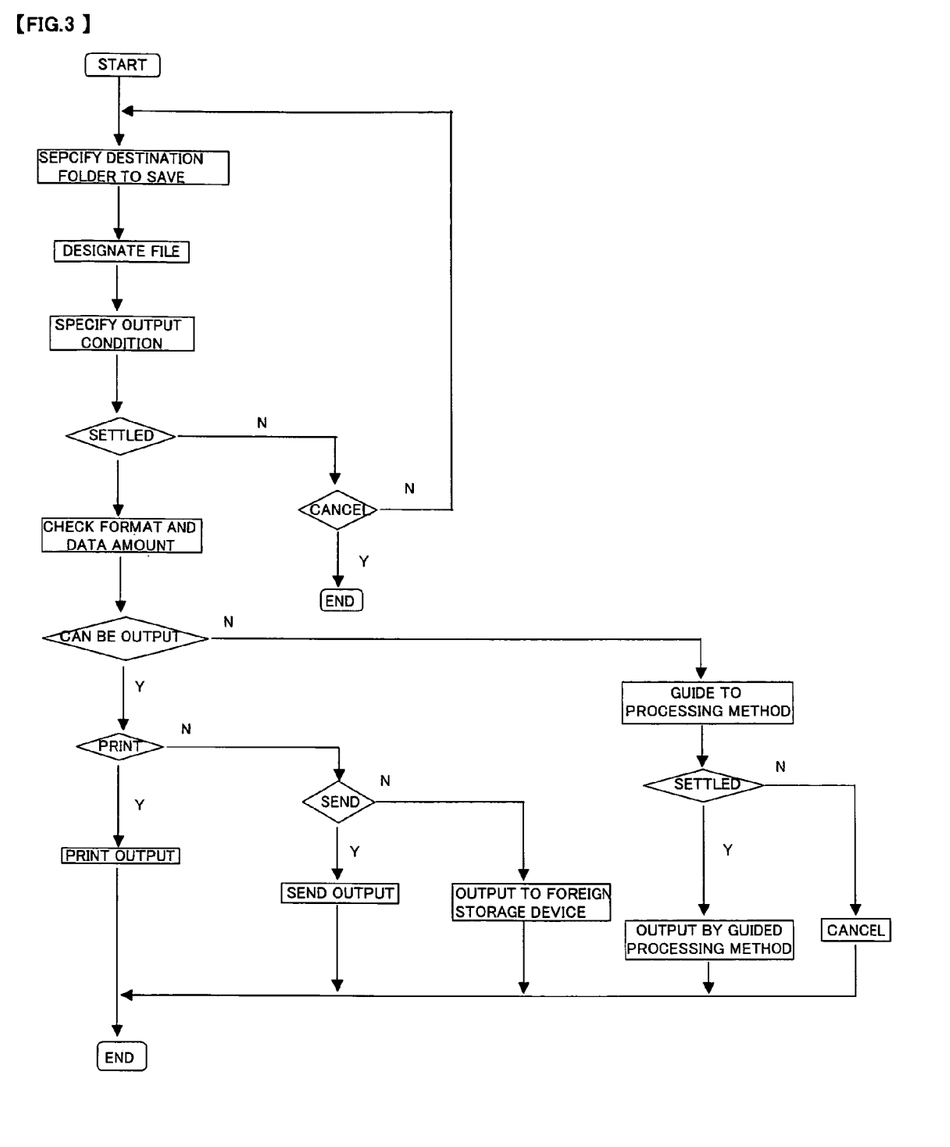
FIG. 3 is a flowchart at data output in data output mode.

Referring to FIGS. 2 and 3, control operation until input data is output will be described. When the data is input, the device control section 9 determines, based on indicated contents input along with data, whether to file the data to execute data output mode. If a request is for processing on typical image data, any data processing mode among copy mode, printer mode, scanner mode or facsimile mode is set. The data is output in indicated mode according to operation of pushing a start button of the operation unit 2 or indication of execution by a foreign apparatus.

If the indication is to execute data output mode, the device control section 9 accumulates the input data into the hard disk device 4. At this time, destination to save the data is specified. More particularly, the data is saved in a specified folder in a filing area in the hard disk device 4. To specify the destination to save, the operation unit 2 inputs the destination to save or a foreign apparatus specifies the destination to save. The device control section 9 can also automatically decide the destination to save. In this case, a folder saving data associated with input data is specified as the destination to save. If there is no such folder, the data is saved in a new folder. The data is saved as a file. A name of the file is an input file name, or the device control section 9 gives a new name to the file based on input date and time, for example. If saving of the data is cancelled, execution in data output mode is stopped and the input data is erased from the local memory 10.

Next, when the input data is output, first the data to be output and its output condition are specified. According to an input from the operation unit or an indication from a foreign apparatus, a file from a folder in the hard disk device 4 is specified and the output condition is specified. The output condition includes a destination to be output, an output form, and a print condition such as the number of copies in print mode. The destination to be output is selected from the information processing apparatus 11, the foreign storage device 6 and the facsimile machine. The output form is selected from image output, data transmission and e-mail attachment.

When a file saving the data and an output condition are settled, a processing method is decided. Then, the device control section 9 determines whether the data can be output by the decided processing method. That is, the section 9 determines by checking attributes of the data, i.e. a data format and a data amount whether the data can be output by the decided processing method. If it determines that the data can be output, the data is output by the decided processing method. In the case of image output, printer mode is executed to print the data as an image. In the case of data transmission, the data is sent to the specified information processing apparatus 11 or the foreign storage device 6. In the case of e-mail attachment, an e-mail attached data is sent to the specified information processing apparatus 11. The output data is erased from the hard disk device 4.

On the other hand, if it is determined that the data cannot be output, the data remains accumulated in the hard disk device 4. In the case of image output, it is determined that the data cannot be output if the image forming section 3 has a problem such as being out of recording material or being out of toner, or if the data cannot be printed under the specified print condition. In the case of data transmission to the information processing apparatus 11, it is determined that the data cannot be output if there is a communication error or the information processing apparatus 11, the destination is powered off. In the case of data transmission to the foreign storage device 6, it is determined that the data cannot be output if a data amount exceeds memory capacity or the foreign storage device 6 is not connected. In the case of e-mail attachment, it is determined that the data cannot be output if the amount of the data exceeds a capacity limit of the attached data.

If the data cannot be output, the device control section 9 guides a user to an appropriate processing method for the data. This guidance displays the processing method on the display unit 2b, or sends guidance on the processing method to the information processing apparatus 11 that requested the output. When the suggested processing method is settled, the data is output by the processing method. For example, if the data cannot be output as an image, the data is sent to the foreign storage device 6 or the information processing apparatus 11 to save the data. If the data cannot be output under a specified print condition, for example the data can only printed as a monochrome image but not as a color image, the data is printed as a monochrome image. If the data cannot be sent to the information processing apparatus 11, the data is sent to another information processing apparatus 11 or the foreign storage device 6. If the data cannot be sent to the foreign storage device 6, the data is sent to a specified information processing apparatus 11. If the data cannot be attached to an e-mail, the data is sent to an information processing apparatus 11 being a destination of the e-mail.

If the suggested processing method is rejected or there is no other appropriate processing method, the output is cancelled. At this time, the data is accumulated in the hard disk device 4. Meanwhile, the device control section 9 notifies the information processing apparatus 11 of the accumulated data. That is, it notifies the specified information processing apparatus 11 of link information to access the accumulated data by sending an e-mail or data. The link information is URL formed by an IP address of the data processing apparatus 11 and information of data position in the hard disk device 4. If the data cannot be sent, it is output as an image. The data that can be output as an image is printed, while in the case of the data that cannot be output as an image, link information of the data is printed.

As described above, when data is input, the data processing apparatus can output the data in some form, whatever attributes the data has. Therefore, a user of the data processing apparatus can directly or indirectly know contents of the data.

A data processing system comprises the above data processing apparatus, a foreign apparatus such as the information processing apparatus 11 or a personal digital assistant, and a data creating apparatus that creates data, wherein the foreign apparatus can output data that is input from the data creating apparatus to the data processing apparatus. This system can output a large variety of data having different attributes in a desired form.

The device control section 9 in the data processing apparatus comprises data integration means for associating a plurality of data and grouping the data when the plurality of data having different attribute are input, and data outputting means for outputting each grouped data to the foreign apparatuses by processing methods for the attributes of each data. The device control section 9 determines, when outputting data, whether a particular processing method applies to the associated data, and if the method applies to the data, it outputs the data by the processing method.

More particularly, in a meeting, an exhibition and the like that produce a large variety of data such as image data, video data, voice data, document data and program data, distributed reference materials are input as image data from the image reading section 1. Remarks are recorded in a recording device such as a voice recorder, from which voice data is input through the communication interface 7. Minutes of meeting created by the information processing apparatus 11 are input as document data by data communication. A moving image or still image is shot by a CCD camera, a Web camera, a video camera or the like, from which video data or image data is input through the communication interface 7. The above recording device, the information processing apparatus 11 and the camera are the data creating apparatuses.

The plurality of input data are associated with one another. The device control section 9 in the data processing apparatus associates and groups each data, thereby integrates a string of data. Then, the input data is accumulated in the hard disk device 4. The grouping includes saving each data file in an identical folder and arranging a common part in names of the data files. For example, the file names contain dates and times that the data have been created.

Next, the device control section 9, when outputting the input data, outputs the plurality of associated data by the particular processing method. The processing method is decided automatically by the device control section 9 based on attributes of each associated data or a data amount. Alternatively, a user inputs the method using the operation unit 2, or an information processing apparatus 11 for an administrator indicates the method.

Figure 4:
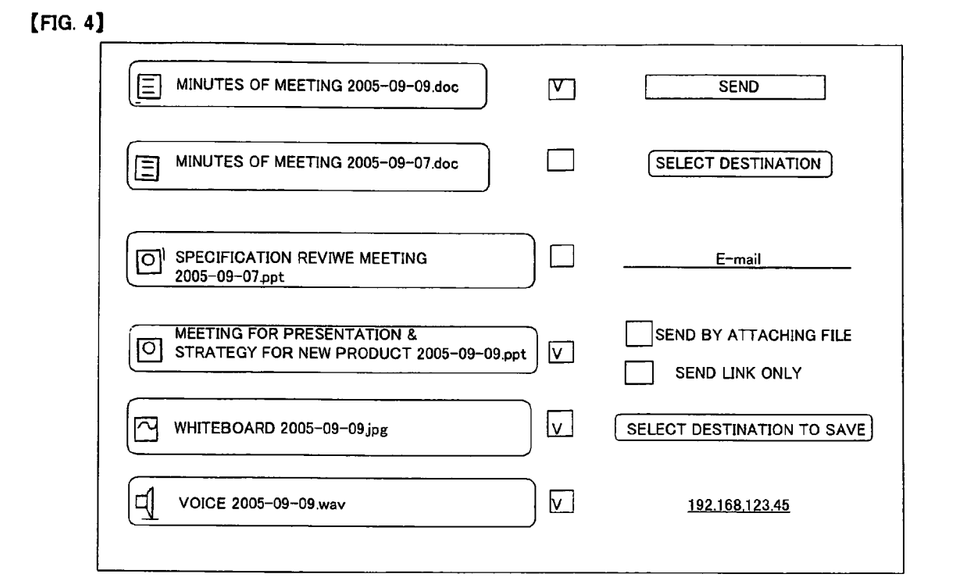
FIG. 4 is a drawing illustrating a screen at data output by an e-mail.
Figure 5:
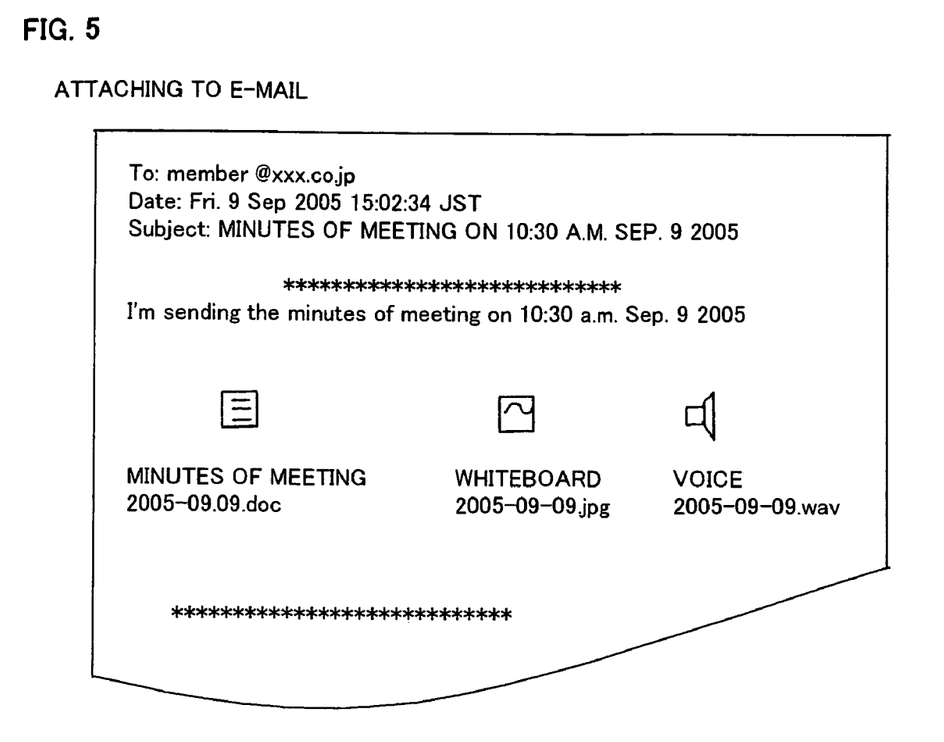
FIG. 5 is a drawing illustrating an e-mail attached data.

When e-mail attachment is selected as the particular processing method, the display unit 2*b* displays a list of data accumulated in the hard disk device 4, as shown in FIG. 4. The associated data are selected from among the list. Data having a corresponding file name are selected through an input operation by a user or a search for a file name by the device control section 9. Then, the device control section 9 creates an e-mail as in FIG. 5 and attaches the plurality of associated data to the e-mail. Then, the e-mail is sent to a foreign apparatus such as a specified information processing apparatus 11. The foreign apparatus, which receives the e-mail, opens the attached data files using application software corresponding to each file to display the data on a display or output by a speaker. Foreign apparatuses such as related information processing apparatuses 11 are previously registered as the destination of the e-mail. The data processing apparatus outputs the data to the registered foreign apparatuses.

Figure 6:
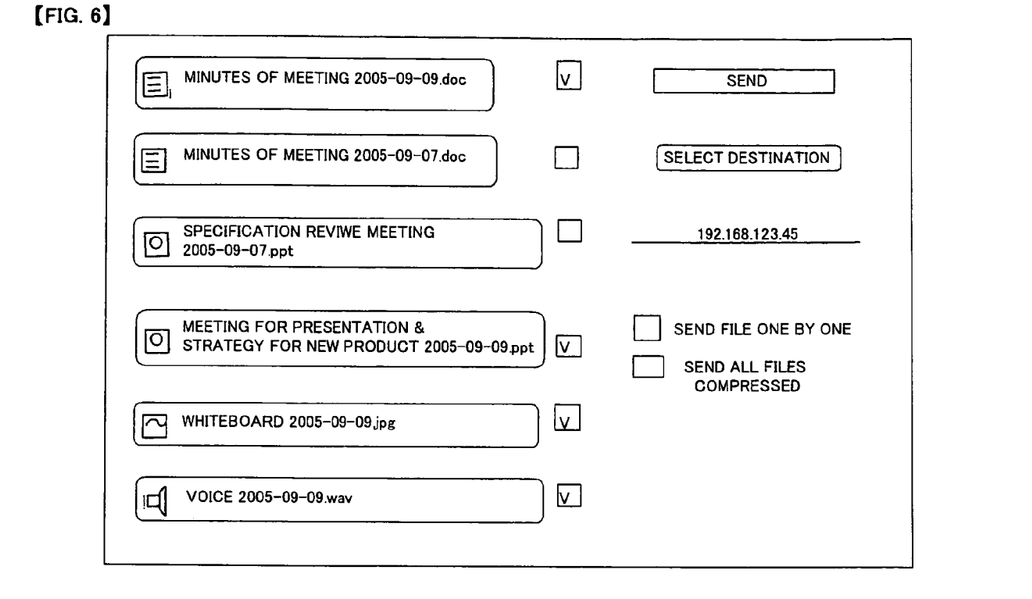
FIG. 6 is a drawing illustrating a screen at data output in data communication.
Figure 7:
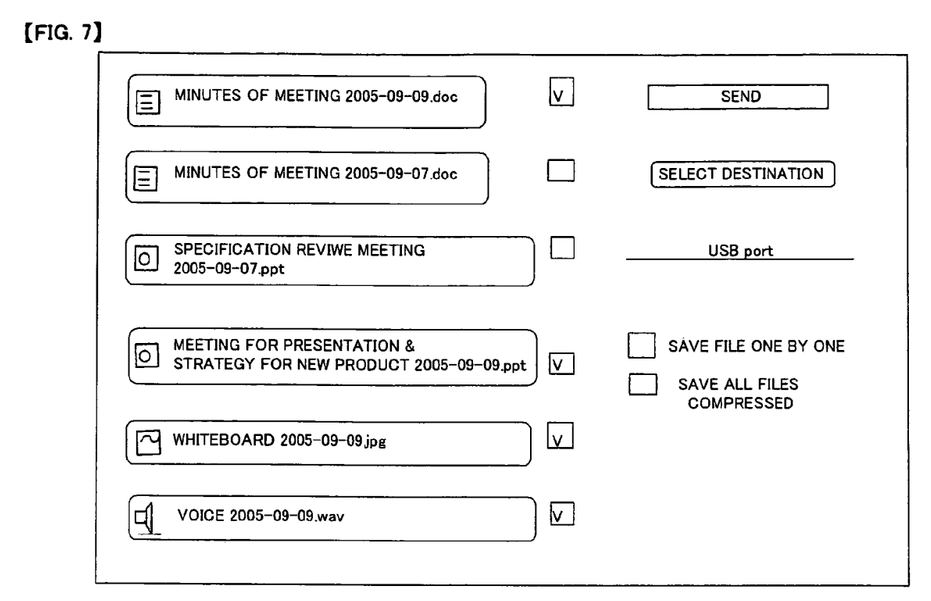
FIG. 7 is a drawing illustrating a screen at data output to a foreign storage device.

If data communication is selected as the particular processing method, associated data are selected similarly as above from among the list of the accumulated data, as shown in FIG. 6, and the destination is decided. Then, the device control section sends the plurality of associated data to the registered foreign apparatuses. Even if the destination is the foreign storage device 6, the associated data are selected as shown in FIG. 7 and sent to the foreign storage device 6. The data are stored in the foreign storage device 6.

Figure 8:
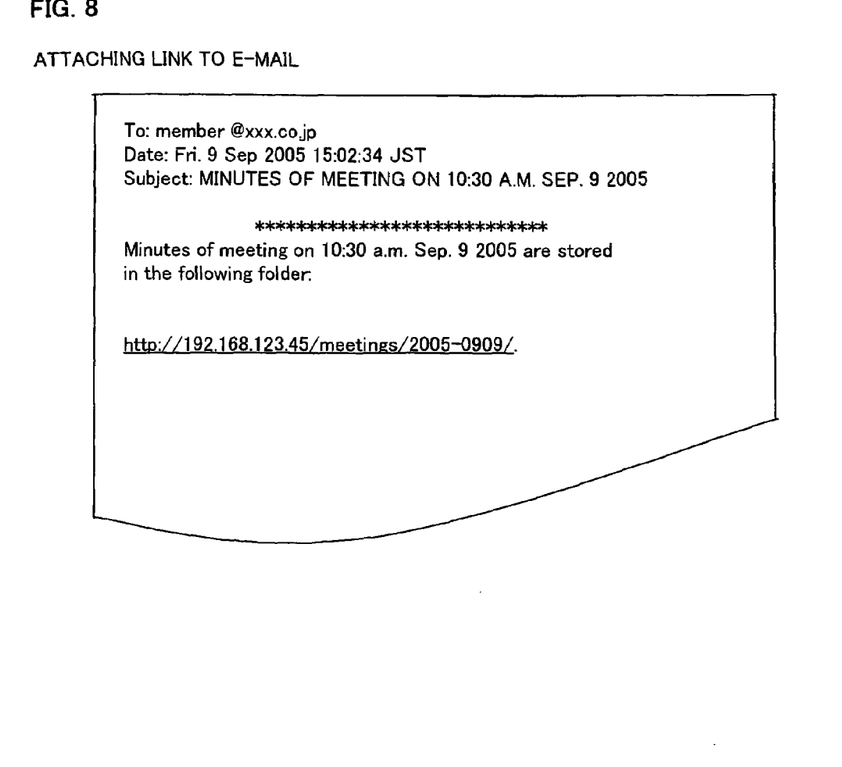
FIG. 8 is a drawing illustrating an e-mail to provide information of data links.

If the associated data cannot be output by the particular processing method, the device control section 9 creates an e-mail describing link information of each data in a message body, as shown in FIG. 8. The e-mail is sent to the registered foreign apparatuses. The link information of each data may be sent to the foreign apparatuses by data communication.

Figure 9:
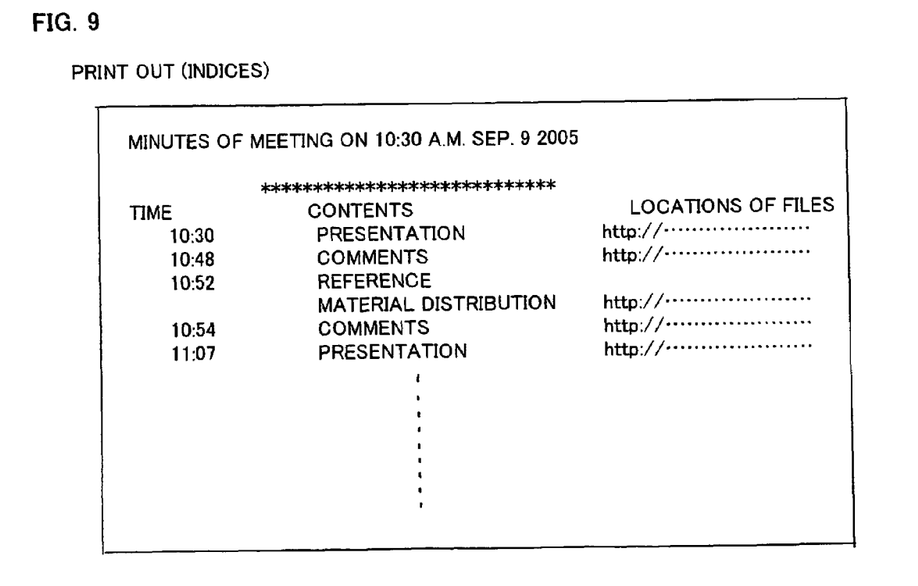
FIG. 9 is a drawing illustrating indices of associated data for which images are output.
Figure 10:
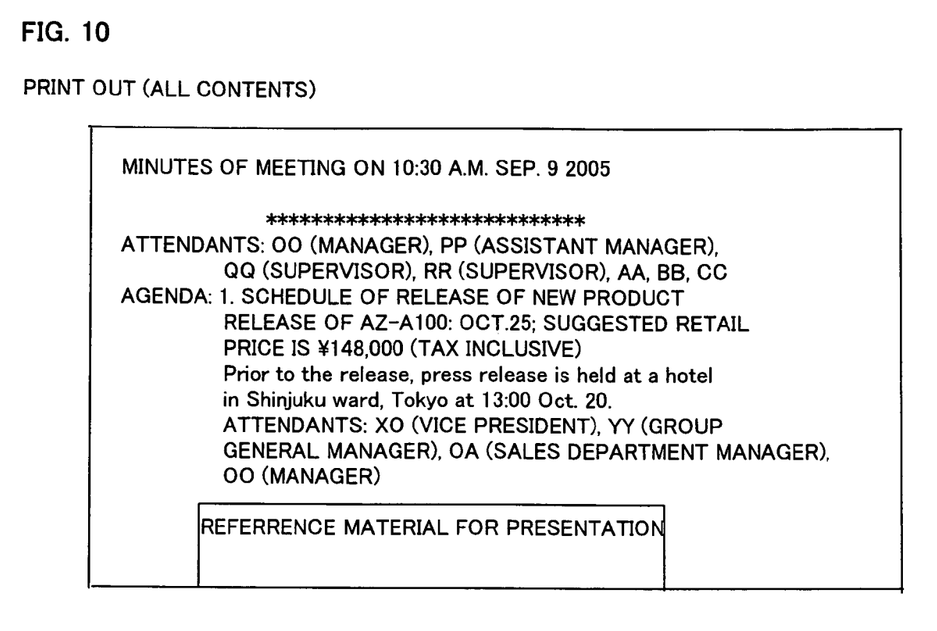
FIG. 10 is a drawing illustrating contents of data for which images are output.

If e-mail or data communication is disabled, another processing method is used wherein the device control section 9 selects an image output. As shown in FIG. 9, indices are created that contain lists of contents of a plurality of associated data or information of destinations to save, and the indices are output by printing. Alternatively, as shown in FIG. 10, in the plurality of associated data, image data is printed, while for data such as a video or a voice incapable of being output as an image, its link information is output by printing.

If the data cannot be output by a processing method, it is also possible to combine a plurality of processing methods. That is, image output and data communication or e-mail are combined. Alternatively, link information of a large amount of data is described in a message body of an e-mail and other data is attached to the e-mail before the e-mail is sent.

It is also possible to select data from among the plurality of associated data and output selected data only. The device control section 9 selects data according to an input operation by the operation unit 2 or a command by a foreign apparatus and outputs the data by a processing method corresponding to the selected data. This enables to selectively output necessary data only. It is usable in the case that the amount of all the associated data is too large to be attached to an e-mail, since only the necessary data can be attached and sent.

As described above, the data processing apparatus functions as a data server. So an information processing apparatus 11 for an administrator manages the data processing apparatus to control data output. Therefore, even if a large variety of data is created in a meeting, the data processing apparatus can group these associated data and output them as minutes of meeting to related foreign apparatuses. The foreign apparatuses can get the associated data together, so they can use the data as desired, thereby increasing utility of the data.

It is to be understood that the present invention is not limited to the above-described embodiments, but many modifications and alterations may be made to the embodiments within the scope of the present invention. The data processing apparatus may only have at least a function of connecting to a network for communication, and may be a multifunction machine with copy mode and facsimile mode, as well as a dedicated machine with single mode, such as a copier, a printer, or a facsimile machine.

A data server connected to a network can be used to accumulate input data. The data processing apparatus sends/receives data to/from the data server and accumulates the input data in the data server. At this time, link information to access the data is an address of the data server.

What is claimed is:

1. A data processing apparatus comprising:
   data inputting means for inputting data;
   data outputting means for outputting data by a pre-determined processing method;
   accumulating means for accumulating the input data; and
   processing decision means for deciding a processing method according to attributes of the input data;
   wherein the data outputting means outputs the accumulated data based on the decided processing method,
   wherein the data includes at least one of image data, video data voice data and text data, and data outputting means comprises image outputting means for outputting the data as an image and data sending means for outputting the data directly, and
   wherein the data sending means comprises:
      communication means for sending the data to foreign apparatus directly;
      data transfer means for transferring the data to a foreign storage device; and
      e-mail means for sending the data to the foreign apparatuses by attaching the data to an e-mail.

2. The data processing apparatus according to claim 1, wherein the processing decision means determines whether the data can be output by the decided processing method, and if the data cannot be output, the accumulating means accumulates the data.

3. The data processing apparatus according to claim 2 comprising guide means for presenting a processing method for the accumulated data.

4. The data processing apparatus according to claim 3, wherein the guide means outputs link information to access the accumulated data.

5. The data processing apparatus according to claim 4, wherein the guide means sends the link information to a specified foreign apparatus.

6. A data processing apparatus comprising:
   data inputting means for inputting data;
   data outputting means for outputting data by a pre-determined processing method;
   data integration means for associating a string of data among a plurality of the input data;
   accumulating means for accumulating the plurality of associated data; and
   processing decision means for deciding a processing method according to attributes of the accumulated data;
   wherein the data outputting means outputs the plurality of associated data based on the decided processing method,
   wherein the data includes at least one of image data,
      video data voice data and text data, and data outputting means comprises image outputting means for outputting the data as an image and
      data sending means for outputting the data directly, and
   wherein the data sending means comprises:

communication means for sending the data to foreign apparatus directly;

data transfer means for transferring the data to a foreign storage device; and e-mail means for sending the data to the foreign apparatuses by attaching the data to an e-mail.

7. The data processing apparatus according to claim 6, wherein the processing decision means determines whether a particular processing method can apply to the plurality of associated data and decides to use said particular processing method if the method can apply to the data.

8. The data processing apparatus according to claim 6, wherein the data outputting means groups the plurality of associated data and then outputs the data.

9. The data processing apparatus according to claim 6 comprising data selecting means for selecting desired data from among the plurality of associated data, wherein the data outputting means outputs the selected data.

10. A data processing system wherein:

the data processing apparatus according to any of claims 1 to 9 and foreign apparatuses are connected to one another through a network such that the apparatuses can communicate with one another, a data creating apparatus that creates the data outputs the data to the data processing apparatus, and the data processing apparatus comprises:

data integration means for associating and grouping a plurality of data when data having different attributes are input; and data outputting means for outputting each grouped data to foreign apparatuses by processing methods for the attributes of each data.

11. The data processing system according to claim 10, wherein the data includes at least one of image data, video data, voice data and text data, and the data outputting means creates an e-mail from the plurality of data in a format that can be output to the foreign apparatuses and sends the e-mail to the foreign apparatuses.

12. A data processing system wherein:

the data processing apparatus according to any one of claims 1-9 and foreign apparatuses are connected to one another through a network such that the apparatuses can communicate with one another, a data creating apparatus that creates the data outputs the data to the data processing apparatus, and the data processing apparatus comprises:

data integration means for associating and grouping a plurality of data when data having different attributes are input; and data outputting means for outputting each grouped data to foreign apparatuses by processing methods for the attributes of each data.

13. A data processing system wherein:

the data processing system according to any one of claims 1-9 and foreign apparatuses are connected to one another through a network such that the apparatuses can communicate with one another, a data creating apparatus that creates the data outputs the data to the data processing apparatus, and the data processing apparatus comprises:

data integration means for associating and grouping a plurality of data when data having different attributes are input; and data outputting means for outputting each grouped data to foreign apparatuses by processing methods for the attributes of each data.

14. The data processing system according to claim 11, wherein the data includes at least one of image data, video data, voice data and text data, and the data outputting means creates an e-mail from the plurality of data in a format that can be output in the foreign apparatuses and sends the e-mail to the foreign apparatuses.

15. The data processing system according to claim 12, wherein the data includes at least one of image data, video data, voice data and text data, and the data outputting means creates an e-mail from the plurality of data in a format that can be output in the foreign apparatuses and sends the e-mail to the foreign apparatuses.

* * * * *